United States Patent
Struye et al.

(10) Patent No.: US 6,271,528 B1
(45) Date of Patent: Aug. 7, 2001

(54) REUSABLE PERSONAL SUN-MONITOR

(75) Inventors: Luc Struye, Mortsel; Paul Leblans, Kontich; Peter Willems, Stekene, all of (BE)

(73) Assignee: Agfa-Gevaert, Mortsel (BE)

( * ) Notice: Subject to any disclaimer, the term of this patent is extended or adjusted under 35 U.S.C. 154(b) by 0 days.

(21) Appl. No.: 09/114,952

(22) Filed: Jul. 14, 1998

(30) Foreign Application Priority Data

Jul. 14, 1997 (EP) .................................................. 97202200

(51) Int. Cl.$^7$ ................................. G01J 5/00; G01J 1/58
(52) U.S. Cl. ......................................... 250/484.5; 250/583
(58) Field of Search ............................. 250/484.5, 488.1, 250/487.1, 485.1, 372 EM, 583, 581

(56) References Cited

U.S. PATENT DOCUMENTS

| | | |
|---|---|---|
| 3,924,135 | 12/1975 | Dhar et al. . |
| 4,853,548 | 8/1989 | Stevens . |
| 4,880,986 | 11/1989 | Yamada et al. . |
| 5,196,705 | 3/1993 | Ryan . |
| 5,306,917 | 4/1994 | Black et al. . |
| 5,469,424 | 11/1995 | Inushima et al. . |
| 5,663,564 | * 9/1997 | Radford ............................ 250/338.4 |
| 5,864,146 | * 1/1999 | Karellas ................................ 250/581 |
| 5,977,556 | * 11/1999 | Qiu et al. ............................. 250/585 |

FOREIGN PATENT DOCUMENTS

| | | | |
|---|---|---|---|
| 5-87633 | * 4/1993 | (JP) .................................. 250/484.5 |

OTHER PUBLICATIONS

Su Ching–Shen et al: Detection of Environmental Ultraviolet Radiation by the Induced Electroluminescence in a Ceramic Detector; IEEE Transactions on Instrumentation and Measurement, vol. 45, No. 2, Apr. 1, 1996, pp. 585–587, XP000591440.

A. Yamadera et al: Development of High Sensitivity Aspire–And Lamda–Ray Personal Diosimeter using Photostimulated Luminescent Detector; Applied Radiation and Isotopes, vol. 46, No. 6/07, Jun. 1, 1995, p. 467/468, XP000512996.

B. Dichter: Fluorescent–Phosphor–Based Broadband UV Light Sensors; Sensors, vol. 10, No. 4, Apr. 1993, pp. 19, 21–22, 24, XP002050194.

V. Mathur et al: Optically Stimulated Luminescence In MgS:Ce,Sm; Radiation Protection Dosimetry, "Proceedings of the Eighth Int'l Conference On Solid State Dosimetry"; Oxford, UK; Aug. 26–29, 1986. (Table of Contents also attached). vol. 17, No. 1–4, 1986, pp. 333–336, XP002050193.

Fukuda et al: Estimation of Ultraviolet Radiation Dose Using CAF2:TB Phosphor; Radiation Protection Dosimetry, "Proceedings of the Eleventh International Conference On Solid State Dosimetry"; Budapest, Hungary; Jul. 10–14, 1995 (Part 1). (Table of Contents also attached). vol. 65, No. 1–4, pp. 325–328, XP002050195.

* cited by examiner

*Primary Examiner*—Constantine Hannaher
(74) *Attorney, Agent, or Firm*—Breiner & Breiner, L.L.C.

(57) ABSTRACT

Method to determine in a quantitative way stored amounts of radiation energy making use therefor from a personal monitor storing absorbed incident radiation energy in a storage phosphor panel storing radiation energy originating from radiation having a wavelength of 350 nm or less, wherein the panel is covered with an optical filter absorbing radiation having a wavelength of 350 nm or more during exposure and present in a housing, and from an apparatus for readout of the storage phosphor panel by the steps of entering the personal monitor in a read-out apparatus, removing optical filter covering the storage phosphor panel, adding stimulating energy to the storage phosphor panel, digitally detecting energy released from the storage phosphor panel by a detector and erasing stored rest energy.

7 Claims, 1 Drawing Sheet

REUSABLE PERSONAL SUN-MONITOR

DESCRIPTION

1. Field of the Invention

Figure 1:
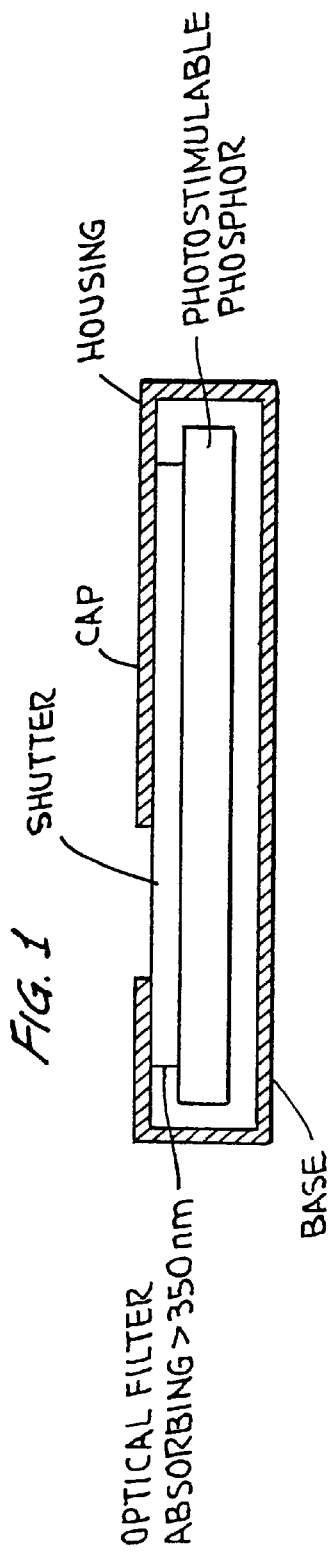

This invention relates to a reusable personal monitor offering the possibility to check in a quantitative way irradiation harmful for the human skin and to predict the recommended time the skin may further be exposed to the said irradiation during next days without further health risk.

2. Background of the Invention

Medical reports with respect to skin cancer disease are frequently warning people for the danger of harmful irradiation the human skin is sensitive to. Said harmful irradiations e.g. can be generated by solar panels and/or by sunlight. Although sunlight is known to have a curing effect as in the so-called heliotherapy, its irradiation spectrum comprising UV-A (315 to 380 nm) and UV-B (280 to 315 nm) rays should be looked at suspicious. Moreover harmful effects were hitherto thought to be due to UV-B rays having a shorter wavelength than UV-A rays, but the Royal Academy for Medicine from Belgium is nowadays seriously warning people that, as is clear from medical observation during last years, UV-A rays are not harmless: basocellular and spinocellular carcinomen as well as the so feared melanoma indeed occur under its influence. Moreover the appearance of actinic elastose, pigment replacements, keratose and actinic porokeratose causes ageing of the human skin. The cumulative effect and reinforcement of the effect of UV-B rays makes the whole issue with respect thereto becoming even more frightening.

Especially people who are frequently visiting "solar centres" are mostly not aware of health risks in that they are not facing the truth that UV-A rays are not harmless and that exposure of the skin to radiation from solar panels is not really preventively protecting the skin from sunlight. In addition thereto people should be warned for the risk of phototoxic reactions if "solar curing" is accompanied by taking medicines.

Therefore it is important to warn people for health risks due to UV-radiation and to suggest annual control of their skin. One way therefore is to check individually the amount of admissible UV-radiation by providing means and ways to check undeniably, and more preferred in a quantitative way, to what extent the human skin has been irradiated by harmful exposure to UV-rays and to predict the time the skin may further be irradiated thereto the same or following days without getting risk of health problems in the future. Therefore there is a stringent need for a cheap, reliable (user friendly and ecologically justified) and quantitative personal monitor in order to secure the inspection of the skin by UV-radiation.

3. Objects and Summary of the Invention

It is an object of the present invention to provide a personal monitor as an indicator making it possible to check in a quantitative way any amount of harmful rays irradiating the human skin.

In particular it is an object of the present invention to provide a quantitative indicator for measuring irradiation of the human skin by (over)exposure to harmful UV-A and UV-B radiation originating from sun-rays and/or solar panels.

It is another object of the present invention to provide a method for quantitatively checking the amount of accumulated radiation and comparing it with radiation doses tolerable within a certain exposure time as a function of age, location on earth, skin type, protection factor of sun cream used, etc.

Further objects and advantages of the present invention will become clear from the detailed description hereinafter.

The objects of the present invention are realized by providing a personal monitor comprising a storage medium for absorbing incident radiation energy, wherein said storage medium comprises a storage phosphor panel capable to store radiation energy originating from radiation having an wavelength of 350 nm or less, wherein said panel is covered with an optical filter absorbing radiation having a wavelength of 350 nm or more during exposure and wherein said panel is present in a housing.

Preferably said housing is provided with a shutter element to avoid exposure at those moments when it is undesirable or irrelevant.

In a more preferred embodiment the radiation energy stored is originating from radiation in the wavelength range from 250 nm to 350 nm, substantially composed of UV-B and UV-A rays.

The objects of the present invention are further realized by providing a method to determine in a quantitative way stored amounts of radiation energy originating from radiation having a wavelength of 350 nm or less, comprising the steps of:

i) providing a personal monitor as set forth hereinbefore;
ii) opening the housing of said monitor thereby irradiating said storage phosphor panel covered with said optical filter by incident radiation in such a way that said panel is exposed proportionally and simultaneously with an object (as the human skin) which is sensitive to said radiation;
iii) closing the said housing,
iv) reading out said storage phosphor panel by the steps of entering the personal monitor (indicator) in a read-out apparatus, removing the optical filter covering the storage phosphor panel, adding stimulating energy to the said storage phosphor panel, digitally detecting energy released from said storage phosphor panel by a detector;
v) erasing stored rest energy.

An apparatus for readout of storage means according to the method of the present invention further comprises a DSP(digital signal processing)-chip in order to quantitatively determine energy released by said storage means.

Said DSP-chip moreover offers digital data of quantitatively detected integral overexposure or underexposure dose of radiation having a wavelength of 350 nm or less, by calculation of the difference between detected radiation values and maximum tolerable values per day (as a function of different external factors).

4. BRIEF DESCRIPTION OF THE INVENTION

Figure 2:
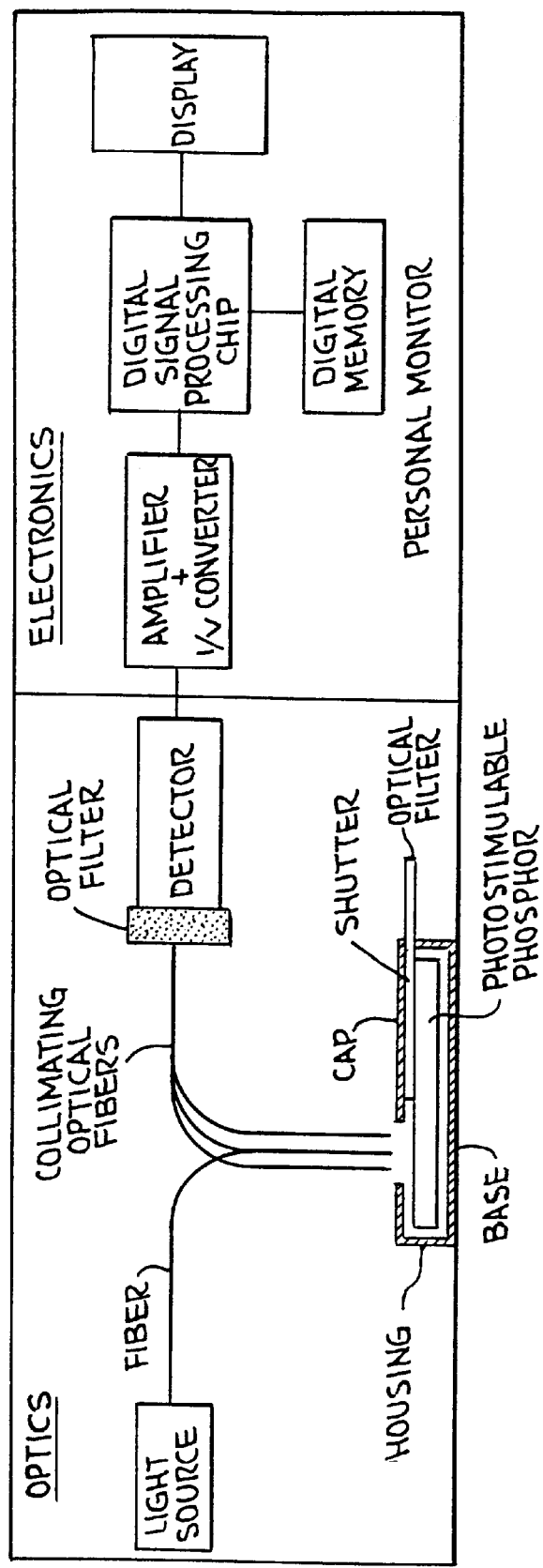

FIG. 1 schematically illustrates the housing including a base, a cap, a shutter, an optical filter and a photostimulable phosphor;

FIG. 2 schematically illustrates the read-out apparatus.

5. DETAILED DESCRIPTION OF THE INVENTION

Under "incident radiation" such radiation should be understood as is generated from visible light, X-rays, α-rays, β-rays, γ-rays, synchrotron radiation, etc., which exists e.g. in the area of nondestructive-testing as well as in the area of medical diagnosis.

A personal monitor for use as an indicator for the said incident radiation comprises means for absorbing said incident radiation, wherein the said radiation is proportionally sensitive to the said radiation when simultaneously with the said indicator an object (as the human skin) is exposed thereto. In the context of the present invention radiation energy having a wavelength of 350 nm or less and, in particular, incident radiation substantially composed of UVB and UV-A rays in the wavelength range of from 250 to 350 nm is simultaneously captured by means comprising a storage phosphor panel and by the human skin, exposed to said incident radiation, originating from sunlight or from solar panels present in "solar centres". In order to store and to accumulate radiation energy from sun light or solar panels it is recommended to store said energy in order to be able to read it out afterwards. A storage phosphor coated onto a panel used as a substrate or a self-supporting storage phosphor panel is the most suitable means therefore. Indeed depending on the chemical composition of the storage phosphor, also called photostimulable phosphor, the said phosphor can be made sensitive in order to capture UV/blue light radiation as has been set forth e.g. in Phys. Review Letter, Vol. 65(19), p. 2438–41(1990); in Prog. Nat. Sci., Vol.3(2), p. 160–164(1993) and in Phys.Status Solidi, Vol.136(1), p. 241–246(1993).

The personal monitor or indicator according to the present invention thus accompanying the person who wants to know what dose of UV-radiation his/her skin has captured during the time he/she has been exposed to the said radiation is therefore provided with a shutter element in order to start exposure by UV/blue-radiation after opening said shutter element from the moment the skin is exposed to the same radiation and by closing it again after ending said exposure. It is clear that the real "exposure time" is in the range from at least several minutes up to hours. In order to prevent exposure of the storage phosphor during the time the housing is closed, it is required that the housing of the indicator according to the present invention is composed of a material which is preventing the storage phosphor panel from any external energy source as long it is closed. Preferred materials for the housing of the indicator according to the present invention are e.g. plastics, opaque to UV- and visible radiation.

In a particular embodiment the photostimulable phosphor panel is present in a cassette of the type comprising a flat substantially rigid base plate and a cap (present as a shutter element) for the base plate which is releasably securable to the base plate in order to light-tightly cover a layer of photostimulable phosphor material applied to a face of the base plate. A particularly cheap housing is e.g. a floppy as is used for a floppy disk, but wherein the said disk is partly replaced by a storage phosphor panel. The said storage phosphor panel may have a small surface of at most a few square centimeter, corresponding to the shutter opening of the floppy disk.

The storage panel is further covered with an optical filter absorbing light having a wavelength of more than 350 nm. In a preferred embodiment the said optical filter is not adhered to the said storage panel, but is present as a window through which, after opening the shutter element of the housing, irradiation of the storage panel by filtered radiation takes place.

The shutter element is further blocked during exposure in order to expose the storage panel to incident radiation and can easily be closed when exposure has ended. During readout in a dedicated readout apparatus, e.g. in form of a disk-drive wherein the "floppy disk" is entered, the shutter is opened again in order to read out the loaded storage panel. It is required therefore to peel off (in case of an optical filter adhered to the storage phosphor panel) or to remove the optical filter (removing with respect to the storage panel which is present under a window formed by the optical filter) in order to admit read-out of the energy stored in the photostimulable phosphor particles of the storage panel.

The personal monitor, also called "indicator", has, instead of a plastic housing, has in its most simple design as a covering or housing for the storage phosphor panel a light-tight film strip or a bag, opaque for UV/blue radiation. Further between said film strip or bag and said storage phosphor panel an optical filter layer covering the phosphor layer of the storage panel is adhered thereto or is situated between said covering and said panel in order to be removed therefrom by sliding without or with minimum contact. In the first case the film strip is easily peelable without damaging the optical layer and/or the phosphor layer.

The indicator made free from its housing (covering film strip or bag) is, just as the indicator having a plastic housing and a shutter, put in a read-out apparatus.

Further embodiments of the read-out apparatus are as follows. A person exposed to UV-irradiation from the sun or from solar panels should further anwser the questions set forth on a screen or display in connection with the read-out apparatus before reading out his personal monitor after entering it in the said apparatus. Typing in integral form on a keyboard or indicating directly onto the display following data about external factors are preferably registrated, wherein some of them may only optionally be included:

age (in years) or birthday of the irradiated person;

skin type e.g. going from a pale skin, red hair, presence of summer freckles, bright eyes" (1) over a non-tanned skin, blond hair, blue eyes (2) to a normal skin, light-colored hair, green or brown eyes (3) and even to slightly tanned skin, brown hair, brown eyes (4) and clearly tanned skin, dark-brown or black hair, dark-brown eyes (5);

location where the radiation has taken place (a picture of the earth globe can be shown, wherein the globe is divided in different "risk zones");

eventually the protection factor of sun cream used;

date (can also be automatically provided, together with the time, in the read-out apparatus), etc.

After read-out of the storage phosphor panel and processing of the results, taking into account the registered data, the processed data are compared with data about maximum tolerable exposure times stored digitally in look-up tables in the read-out apparatus.

The results obtained are then stored in digital form in a digital memory storing medium in the personal monitor. A report on the display of the read-out apparatus may appear and the report can be made available to the interested person as a hard-copy, in form of e.g. a printed ticket. On that ticket the number of hours and/or minutes over- or under-exposure by sunlight or light from solar panels the person has got for that day. Moreover a personalized preview for the maximum tolerable irradiation which is acceptable for that day and for the following day or days (e.g. over a period of the coming 3 days) is preferably reported. This value can also further stored be on the said digital memory storing medium making part of the personal monitor according to the present invention.

The person exposing his/her skin to UV-radiation from the sun or from solar panels, etc., is thus able to control if the daily UV-exposure his/her skin has got is still within the tolerable boundaries as a function of age, skin type and location on earth in order to detect possible health risk in the future.

Said storage phosphor panel as a detector and storage element of UV-radiation, making part of the personal monitor according to the present invention, is comprising a stimulable phosphor layer coated onto a support and is covered (adhered thereto or as a window thereupon) with an optical filter absorbing radiation having a wavelength 350 nm or more in order to prevent detection of energy from radiation having a wavelength in the long-UV range or even in the blue light energy range and in order to prevent stimulation of stored energy to be released from the said storage phosphor panel before becoming read out.

Preferred optical filters for use in the indicator according to the present invention are the commercially available filters "U-330" and "U-340" from Hoya; the gelatinous L369-filter from Agfa-Gevaert and the "UG1" and "UG11" filters from Schott.

It is clear that according to the present invention said means for absorbing UV-irradiation comprises a storage phosphor panel capable to store radiation energy originating from radiation having a wavelength of up to 350 nm which is highly sensitive to the said radiation. In a preferred embodiment storage phosphors or photostimulable phosphors of the storage phosphor panel present in the personal monitor of the present invention are sensitive to a radiation dose of from about 170 $\mu$Gy or more (in the case of "static read-out" or "discontinuous" read-out of the light emitted by the storage phosphor after stimulation) and even from about 45 $\mu$Gy or more (in the case of scanning of the storage phosphor panel, also called "continuous" or "dynamic" read-out).

Storage phosphor panels or photostimulable phosphor panels are well-known in the field of digital radiography wherein a system has been developed wherein X-rays transmitted by an exposed object (such as the body of a patient) are stored in a photostimulable phosphor screen. Such a photostimulable phosphor screen or panel comprises a layer of photo-stimulable luminescent material which comprises a suitable storage phosphor, a suitable binder material and a support whereto the said supported phosphor layer is adhered. In the alternative said photo-stimulable material is a self-supporting material.

If coated onto a support the storage phosphor is normally present on one side of said support as normally one side only is irradiated. Further the said storage phosphor panel can occupy an entire surface of the panel support or only a portion thereof. It is sufficient that only that part of the support, covered by the "window" which is opened by the shutter, is provided with storage phosphor particles in order to expose the storage phosphor just on the irradiated part of the whole support. Preferably in the indicator or personal monitor according to the present invention a patch of storage phosphor having a surface between 1 cm$^2$ and 10 cm$^2$ is present. More preferably said patch of phosphor has a surface between 1 cm$^2$ and 5 cm$^2$ and even more preferred is a surface between 1 and 2 cm$^2$.

In a preferred embodiment of the present invention, the storage phosphor on the support of the storage phosphor panel covered with an optical filter is further enclosed in a light tight covering or housing provided with a shutter. Opening the shutter in order to expose the storage phosphor to UV-irradiation and closing it again in order to prevent further exposure after a certain time (normally a number of hours) provides the ability to check quantitatively, after conversion of detected signals, the really captured energy values per surface unit (e.g. in mJoule per square cm or in J/m$^2$). The captured energy which has been stored in the storage phosphor, after readout, indeed corresponds with an amount of energy provided by sunlight or light originating from solar panels. As a function of age, skin type, location on earth and, optionally, on the protection factor of sun cream used, it is possible to make a comparison between the said amounts of energy captured by the human skin and to the maximum tolerable amounts stored in so-called look-up tables.

Treshold Limit Values (TLVs™) and Biological Exposure Indices (BEIs™) have e.g. been given by the ACGIH (American Conference of Governmental Industrial Hygienists). In the Worldwide Edition 1995–1996, p. 119–122 e.g., TLVs™ referring to ultraviolet radiation in the spectral region between 180 and 400 nm are given under which it is believed that "nearly all workers may be repeatedly exposed without further adverse health effects". It is clear that, as can be read on p. 122 of the reference cited hereinbefore, that "tanned individuals can tolerate skin exposure in excess of the LTV without erythemal effects . . . " but that ". . . such condition may not protect persons against skin cancer".

From Table 2 on the same page e.g. permissible UV-exposures may vary from an effective irradiance of 0.1 mW/cm$^2$ during 8 hours to e.g. 3 mW/cm$^2$ during 1 s.

As has been described in ASP Originalia, 7/1986 p. 177–181 (Arbeitsmed. Sozialmed. Praventivmed. 21(1986)) a maximum tolerable exposure time $t_{max}$ is expressed by the formula $$t_{max}=3MJ/cm^2/E_{\mathit{eff}}$$

wherein $E_{\mathit{eff}}$ represents the effective radiation exposure energy. With respect to the UV-A rays (between 320 and 400 nm) the said maximum tolerable time $t_{max}$ is however extended to a value $$t_{max}=1J/cm^2/E_{\mathit{eff}}$$

for total measuring times up to 17 minutes. For longer exposure times a maximum exposure intensity (power) of 1 mW/cm$^2$ should not be exceeded.

The same conclusions can be found in "Tijdschrift voor toegepaste Arbowetenschap 2 (1989) no. 5, p. 73–79 and no. 6, p. 103–104".

The personal monitor should therefore preferably be read out in an apparatus present e.g. in regularly divided locations along the shores where sun-bathing commonly occurs and in pharmacies or drug stores in order enable every interested person to personally determine, as a function factors set forth hereinbefore, the further maximum tolerable dose from sun or sun panel irradiation for the same day and even for the following days.

A comparative scale as set up e.g. in EOS-magazine, July-August 1997, p. 38 and following, may be useful. Corresponding data stored digitally in form of a look-up table in the read-out apparatus make a difference possible to be calculated between the really captured exposure energy and the maximum tolerable energy for the irradiated person.

In order to personalize the still acceptable time the skin may be irradiated by the sunlight during the same day and/or the following days cumulative results over a period of one day and/or several days are preferably stored in the memory of the said monitor, wherein the said memory is a digital memory, e.g. in form of an EPROM, a bubble memory, a non-volatile RAM or a magnetic memory, preferably in form of a disk (as a floppy in a diskette).

In a preferred embodiment a floppy drive is used as a cassette (also called "indicator" or "personal monitor"), wherein said floppy drive is partly used as a digital memory storing medium. In this cassette a digital memory as an EPROM, a bubble memory, a nonvolatile RAM or a magnetic memory or a combination thereof thus provides the cassette with one or more kinds of memories, enabling to store data over a long period of time. The exposure history of the skin by ultraviolet rays from the sun and/or from solar panels can thus be stored and accompanying warning signs can be dealt with to the person carrying the cassette as a personal monitor.

In the personal monitor according to the present invention said storage phosphor absorbing UV-radiation is coated on a support from a powder of phosphor dispersed in a binder. In this case the powder comprises phosphor particles having a particle size distribution with an average volume diameter ($d_{v50}$) between 1 µm and 100 µm. The amount of storage phosphor present on the support of the indicator, in the case of a phosphor powder, ranges from 10 mg/cm$^2$ to 400 mg/cm$^2$, and more preferably the amount of phosphor powder ranges from 20 mg/cm$^2$ to 200 mg/cm$^2$. The storage phosphor can in principle be present as a single crystal on the support of the panel of the personal monitor according to the present invention.

Examples of stimulable phosphors employable in the radiation image storage panel used in the personal monitor of the present invention include:

SrS:Ce, Sm, SrS:Eu, Sm, ThO$_2$:Er, and La$_2$O$_2$S:Eu, Sm, as described in U.S. Pat. No. 3,859,527;

ZnS:Cu,Pb, BaO.xAl$_2$O$_3$:Eu, in which x is a number satisfying the condition of $0.8 \leq x \leq 10$, and M$^{2+}$O.xSiO$_2$:A, in which M$^{2+}$ is at least one divalent metal selected from the group consisting of Mg, Ca, Sr, Zn, Cd and Ba, A is at least one element selected from the group consisting of Ce, Tb, Eu, Tm, Pb, Tl, Bi and Mn, and $\underline{x}$ is a number satisfying the condition of $0.5 \leq x \leq 2.5$, as described in U.S. Pat. No. 4,326,078;

M$^{III}$OX:xCe, in which M$^{III}$ is at least one trivalent metal selected from the group consisting of Pr, Nd, Pm, Sm, Eu, Tb, Dy, Ho, Er, Tm, Yb and Bi; X is at least one element selected from the group consisting of Cl and Br; and $\underline{x}$ is a number satisfying the condition of $0<x<0.1$, as described in JP-A 58-69281;

LnOX:xA, in which Ln is at least one element selected from the group consisting of La, Y, Gd and Lu, X is at least one element selected from the group consisting of Cl and Br, A is at least one element selected from the group consisting of Ce and Tb, and $\underline{x}$ is a number satisfying the condition of $0<x<0.1$, as described in the above-mentioned U.S. Pat. No. 4,236,078;

(Ba$_{1-x}$M$^{III}_x$)FX:yA, in which M$_{II}$ is at least one divalent metal selected from the group consisting of Mg, Ca, Sr, Zn and Cd, X is at least one element selected from the group consisting of Cl, Br and I, A is at least one element selected from the group consisting of Eu, Tb, Ce, Tm, Dy, Pr, Ho, Nd, Yb and Er, and $\underline{x}$ and $\underline{y}$ are numbers satisfying the conditions of $0 \leq x \leq 0.6$ and $0 \leq y \leq 0.2$ respectively, as described in U.S. Pat. No. 4,239,968;

bariumfluorohalide phosphors as disclosed in, e.g., U.S. Pat. No. 4,239,968; DE OS 2 928 245; U.S. Pat. No. 4,261,854; U.S. Pat. No. 4,539,138; U.S. Pat. No. 4,512,911; EP-A 0 029 963; U.S. Pat. No. 4,336,154; U.S. Pat. No. 5,077,144; U.S. Pat. No. 4,948,696; JP-A 55-12143; JP-A 56-116777; JP-A 57-23675; U.S. Pat. No. 5,089,170; U.S. Pat. No. 4,532,071; DE OS 3 304 216; EP-A 0 142 734; EP-A 0 144 772; U.S. Pat. No. 4,587,036; U.S. Pat. No. 4,608,190 and EP-A 0 295 522;

Ba$_{1-x}$Sr$_x$F$_{2-a-b}$X$_b$:zA, wherein X is at least one member selected from the group consisting of Cl and I; x is in the range $0.10 \leq x \leq 0.55$; a is in the range $0.70 \leq a \leq 0.96$; b is in the range $0 \leq b \leq 0.15$; z is in the range $10^{-7} < z \leq 0.15$, and A is Eu$^{2+}$ or Eu$^{2+}$ together with one or more of the co-dopants selected from the group consisting of Eu$^{3+}$, Y, Tb, Ce, Tm, Dy, Pr, Ho, Nd, Yb, Er, La, Gd and Lu, and wherein fluorine is present stoichiometrically in said phosphor in a larger atom % than bromine taken alone or bromine combined with chlorine and/or iodine, as disclosed in EP-A 0 345 903;

alkali metal phosphors comprising earth alkali metals as disclosed in e.g. U.S. Pat. No. 5,028,509 and EP-A 0 252 991;

halosilicate phosphors as disclosed in e.g. EP-A's 0 304 121, 0 382 295 and 0 522 619.

The above-described stimulable phosphors are given by no means to restrict the stimulable phosphor employable in the present invention. Any other phosphor can be also employed, provided that the phosphor gives stimulated emission when excited with stimulating rays after exposure to UV-radiation.

Barium fluorohalide phosphors, more preferably barium fluorobromide phosphors and still more preferably europium doped barium fluorobromide phosphor cannot only be energized to an excited state by X-rays but also by UV-rays, and can then be stimulated by light within a first wavelength range to return to the ground state with the emission of light within a second wavelength range. The stimulating radiation is arranged in order to have a different wavelength from the emitted light. In praxis use is made of a europium activated or doped bariumfluorobromide storage phosphor, wherefore the stimulating light is situated within the range of 600–700 nm (red light) and the emitted light is situated within the range of 350–450 nm (blue light).

As a very cheap and very compact stimulating light source an electro-luminescent screen is used. Such a screen is compact as it is available as a thin foil.

The stimulating light is focussed at one site (or in the alternative consecutively focussed at different sites) or in another embodiment the stimulating light is scanned over the phosphor panel.

It is further required that the storage phosphor panel of the personal monitor according to the present invention comprises storage phosphors having a dark decay of more than 2 hours in order to be able to read out the stored energy with high enough a precision in the dedicated read-out apparatus which will be described hereinafter in different embodiments.

In praxis it is necessary to read out and to get an acceptable result, even 15 hours after ending exposure. The phenomenon called "dark decay" should be understood as follows. A storage phosphor, having stored energy after being exposed to incident radiation as e.g. ultraviolet radiation as in this application, can release said stored energy also without irradiation by stimulation light. This latter way of releasing energy is called "dark decay". The dark decay is measured by irradiating a phosphor by radiation of 70 kVp, and, immediately after said irradiation, stimulating said phosphor by a He—Ne laser of 30 mW. The fluorescent light emitted by the phosphor upon stimulation is collected and brought e.g. to a photomultiplier (as e.g. the commercially available HAMAMATSU R 376) giving a corresponding electrical current, proportional to the amount of initially emitted fluorescent light. The irradiation of the phosphor with the said radiation can be repeated, but the reading of the amount of stimulable light for a given intensity of stimulating energy can only take place after keeping the irradiated storage phosphor with its stored energy for a given time in the dark. This process is repeated and the time after which the emitted fluorescent light (and thus the energy remaining in the phosphor) of a phosphor kept in the dark, has fallen to a level equal to 1/e ("e" being the basic number for natural logarithm scale) is recorded as "dark decay". In the practical embodiments of the present invention the storage phosphor preferably has a dark decay longer than 120 minutes (2 hours) and preferably even much larger.

In order to read the energy stored in the exposed storage panel, the indicator according to the present invention is transported to a dedicated read-out apparatus wherein it is read-out in static mode (focussing or fixing the stimulating radiation on one site or consecutively on more sites of the storage panel) or in dynamic mode by two-dimensionally scanning with stimulating energy.

In one embodiment according to the method of the present invention the stimulating energy required in order to read out the energy stored in the storage phosphor is originated from visible light as has already been illustrated hereinbefore. Especially preferred is e.g. the use of a diode laser having a wavelength of 670 nm as e.g. the 5 mW laser at 670 nm from Power Technology type SPM-685-35-201, which is interesting with respect to its high power, or the use of LED's which is interesting due to its low cost. When using LED's, the use of high brightness Red LED's composed of AlGaAs is preferred. Any laser known in the art can in principle be used in this invention for stimulating a stimulable phosphor, but preferably a laser emitting light with a wavelength above 450 nm is used. Photodiodes are, just as phototransitors, very cheap, and, although less sensitive, very useful in this application.

In another embodiment said stimulating energy is originated from thermal energy (wherefore useful heat stimulable phosphors, are used as, e.g., SrS:Ce,Sm; SrS:Eu,Sm; etc., as disclosed in U.S. Pat. No. 3,859,527 or LiF:Mg,Ti available from Harshaw Chemical Company, Cleveland, Ohio, USA and in still another embodiment said stimulating energy is originated from electroluminescent energy as detection is simple from this plane and compact detector with a low cost as has e.g. been disclosed in U.S. Pat. No. 4,346,406. Storage phosphors, both heat stimulable and light stimulable, having slow dark decay are e.g. phosphors with formula :

SrS:Eu,Sm; $Ba_{1-xSrx}F_{2-a-bBra}X_b:Eu^{2+}$, wherein X is at least one halogen selected from of Cl and I, $0 \leq x \leq 0.3$ and 2-a-b>1; $Ba_{1-x}Sr_xFCl$, wherein $0 \leq x \leq 0.3$; $Cs_2NaYF_6$; and alkalihalides as e.g. $RbBr:Ga_{1+}$.

It is preferred in accordance with the present invention to use a stimulable phosphor that can be stimulated on a small spot thereof by a semiconductor or diode laser. When using such a phosphor a small laser can be used in the reader and the reader can be constructed very compactly. Very useful phosphors, being stimulable with a laser with small dimensions or by a small heating source, are, e.g.

SrS: EU, Sm; $Ba_{1-x-y}Sr_xCa_yF_{2-a-b}Br_aI_b$: $Eu^{2+}$, wherein x.y>0, $0.1 \leq b \leq 1.00$ and, preferably, 2-a-b>1.

During stimulation of the stimulable phosphor, stimulated light is emitted when the phosphor has been exposed to UV-rays. In one embodiment for reading out dynamically the energy stored in stimulable phosphors by visible light, a light beam having a wavelength within said first or stimulating wavelength range is deflected in order to scan the screen in a first direction (called main scan direction) while the screen is transported in a second direction that is perpendicular to the main scan direction. Detection of the said released energy proceeds by an optical system comprising as basic constituents photo-electronic light detectors providing analogue signals that are converted into digital time-series signals, normally a digital signal processor or DSP. Such DSP can be considered as a computer integrated into one chip and optimized to provide rapid calculation ability: per second up to 30 million multiplications and 2 million of divisions and within 2 seconds a square root analysis can be performed if 50 data (measuring points) are piled up. Calculations are all performed in double precision, i.e., 2 bits together for 1 number and fixed point numbers of 32 bits. This makes the apparatus according to the invention to stay compact and cheap. A commercially available DSP-chip from ANALOG DEVICES, type ADSP2181, has been used in praxis. The apparatus according to the present invention thus provides means in order to calculate corrections when a decrease of the signal caused by dark decay or overexposures with visible light.

In praxis use is therefore made from mathematical algorithms in order to average different measuring points to only one number and in order to integrate the signal numerically in order to calculate the corresponding energy contents. Calculation of a theoretical analytical function by means of square root analysis makes all measuring points useful as noise has a relatively less strong influence. Moreover the presence of coincident peaks due to disturbing voltage peaks is less disturbing.

In order to perform these calculations two analytical functions are useful:

a function expressing an exponential decay (see formula I)

$$y(t)=A*E^{-t}+B \quad (I)$$

and a function expressing a "power law" (see formula II)

$$y(t)=A*(t+Tx)^{-n}+B \quad (II)$$

wherein
A is the amplitude of the signal;
B is the correction for the zero reference line (correcting the base line).
Other symbols will be explained hereinafter.

Formula (I), expressing exponential decay corresponds with a hyperbolic function, with a shifted x-axis.

Formula (II) is the best function fitting experimentally measured data and is therefore in praxis used in order to perform automatic corrections: in the apparatus for read-out of storage means according to the method described hereinbefore, said apparatus further comprises a DSP(digital signal processing)-chip in order to quantitatively determine energy released by said storage means. Data about tolerable exposure times or about tolerable exposure energy as a function of external factors mentioned above are available from look-up tables and are further stored on the said DSP-chip. The said DSP-chip moreover determines the decrease of the signal caused by dark decay or overexposure with visible light. Dark decay and/or overexposure with visible light indeed make the stored energy in the storage phosphor decrease.

The results with respect of stored exposure energy are thus lower than those of the real signals obtained. If we take the assumption that the power law set forth hereinbefore is the most suitable theoretical function expressing the decay, then the starting point measured is shifted with respect to the point corresponding with the really captured energy: the first part of the expected graphical representation thus fails. After fitting the curve another value of Tx will be found, but the same value of A (the amplitude) and n (the power). The value of n only depends on the type of storage phosphor used and may be considered constant. In that case integration under the curve from a value −Tx to infinity is proportional to the amplitude and is independent on the other parameters.

To summarize: when the energy stored in the storage phosphor has been diminished due to dark decay or (false light) exposure, then the first part of the curve has not been measured. Nevertheless kinetics has been unchanged, so that after fitting the curve by means of the "power-law" algorithm the amplitude corresponding with the original signal is found back again, independent on dark decay and on false visible light exposure.

As a consequence it is even not required to know or to indicate the time interval between UV/blue light exposure from the sun or solar panel and the time the indicator has been put into the apparatus. Even the incident visible light intensity is not important. It is clear that the accuracy with which the correction is performed is depending on the accuracy with which the theoretical function has been determined. Therefore the calculation is performed in double precision mode (32 bit numbers). Another factor determining the accuracy is the weakening of the signal or the decay time: although the calculation still leads to perfect results, even with a weakening factor of 2, such high precision can only be attained if such a "half-life" is not exceeding a recommended time interval of about 15 hours. The said time interval however is really sufficient to detect the dose captured in one sunny or "artificially made" sunny day (by solar panels).

Preferred read-out providing means are further described hereinafter.

In EP-Application No. 97200267, filed Jan. 31, 1997 a method for obtaining an electrical representation of an amount of radiation by means of a CCD sensor as read-out means is demonstrated, characterized by the steps of exposing a stimulable phosphor panel to radiation, thereby recording the radiation stored on the phosphor plate, stimulating said panel by light guided from a light source to
the said panel, said light having a wavelength within the stimulating wavelength range of said stimulable phosphor and causing said phosphor panel to emit stimulated light,
guiding said stimulated light from said phosphor panel to a twodimensional CCD sensor and detecting said stimulated light by means of said CCD sensor, wherein said CCD sensor is kept in a static relation relative to said phosphor plate during charge build-up in said CCD,
converting the detected stimulated light into said electrical representation.

As an advantage it has therein been illustrated that by the use of the stimulable phosphor panel and the CCD sensor, several pixels are readout at the same time and also that the readout time for each pixel can be made longer. So this method also enables the use of phosphors having a decay time which can lie in the range of 10 ms to 300 ms without loss of resolution. By using optics having a high collection efficiency when detecting the stimulated light the number of detected photons for every absorbed UV-ray photon is even larger. With that method the storage phosphor can be read-out more deeply, enhancing thereby the accuracy which depends strongly on the quantum conversion efficiency. It is a further advantage that with this method the choice of light sources is not restricted to diffraction limited light sources. The stimulating light source providing the stimulating light for stimulating the phosphor can be any lamp, such as Tungsten Halogen Lamps, Mercury Lamps, Xenon Lamps and Sodium Lamps. This light source can also be an array of LED's emitting blue (467 nm), pure green (557 nm), green (565 nm), yellow (586 nm), orange (610 nm), red (660 nm) or infrared (850 nm) light. The light source can also be a laser such as Argon-ion, Krypton, frequency doubled and non frequency doubled Nd:YAG and diode lasers. The light source does not need to be focused. Hereby strong lamps and high intensity laser-diode array's can be used. By this increase of the amount of energy used to stimulate the phosphor, the phosphor is read-out more deeply.

It is preferred in the present invention to use a stimulable phosphor that can be stimulated by semiconductor or diode laser. When using such a phosphor a small laser can be used in the reader and the reader can be constructed such as to be a hand-held device. Very useful phosphors, being stimulable with a laser with small dimensions or by a small heating source, are, e.g., the SrS:Eu,Sm; $Ba_{1-x-y}Sr_xCa_yF_{2-a-b}Br_aI_b$: $Eu^{2+}$, mentioned hereinbefore, wherein x.y>0, $0.1 \leq b \leq 1.00$ and, preferably, 2-a-b>1.

In a preferred embodiment according to the present invention for providing a high light collection efficiency it is an advantage that light guiding is performed using fibre optics for guiding stimulating light from the light source to the phosphor plate. The fibre optic means can be a Fibre Optic Plate consisting of a great number of parallel arranged optical fibres, arranged in a coherent bundle fused together to form one unit. A further advantage is the use of fibre optics for guiding emitted light from the phosphor panel to a CCD, as this provides an even higher collection efficiency for the whole system. The input face of the fibre optic assembly is therein in close contact with the phosphor panel in order to obtain a sharp image.

In order to obtain a larger readout area the light guiding between the light source and the plate or between the plate and the CCD can be done by the use of tapered fibre optics as this ensures a good collection efficiency together with a larger readout area for the CCD. In a tapered fibre optic the input and output face of the optic have a different dimension so the guided input image is reduced/enlarged reproduced at the output side.

In order to obtain a good signal to noise ratio detection of stimulation light by the CCD should be avoided. Therefore color filter means should be provided in order to prevent stimulation light to reach the CCD. A color filter means is disposed in the path between the plate and the CCD and has a certain thickness, preferable as thin as possible. A thin gelatin filter is preferred while it is cheap and provides good filtering properties.

It is a further advantage to use doped fibres for light guiding to the CCD. This provides filtering of the guided light enabling separation of stimulation and emitted wavelength.

A preferable embodiment makes ues of a pulsed stimulating light source. This is a further advantage because this will reduce the amount of stimulating light reaching the CCD, even when filters have already been provided for blocking the stimulating light from the CCD.

In another preferable embodiment the readout is done in time-resolving mode. Therein a new charge build-up period in the CCD is started after a stimulating light pulse is given to the phosphor. The detection of the stimulated light is stopped just before a further light pulse is given. Conversion of the detected light can be conducted in a later step. This time resolving method makes the readout system totally insensitive for the stimulating light: only the signal representing the stimulated light of the storage phosphor reaches the signal processing unit. A further important advantage obtained by using this method is that the use of optical filters for separating stimulating and stimulated wavelengths becomes obsolete. With this method readout can be done with a cheaper and simpler apparatus. An even greater advantage is that this enables the use of storage phosphors exhibiting stimulation properties where the stimulating wavelength of the phosphor is close or even within the emitted wavelength range. Although this method is very favorable when using a CCD for readout of the stimulated image because many pixels are readout at the same time, the time resolving mode can also be used in other methods known for readout of storage phosphor plates. In a laser scanner, usually employing a galvanometer, polygon mirror or electro-optical device for the purpose of light deflection, a light pulse is given at each pixel position when scanning the plate. Detection of the fluorescence by a light collector and photomultiplier is done in between the light pulses. The system can also be employed when using continuous scanning (in dynamic mode) with CCD's to readout a phosphor plate. Herein the plate is stimulated by a pulsing line of light while the CCD (e.g. with fibre-optic coupling) scans the plate in synchronized manner in order to detect the fluorescent light. Hereby it is possible to drive the CCD in time delay integration mode whereby the total readout time is even larger.

In the method using a continuous or dynamic mode the emitted light is measured during stimulation. Filtering of unwanted radiation can be achieved by adding a colored glass filter or a thin gelatin filter between the phosphor layer and Fibre Optic Plate. Filtering can also be done by the Fibre Optic Plate itself if doped glass fibres are used. Gelatin filters can be made very thin and therefore they can be placed between the phosphor layer and the Fibre Optic Plate without losing resolution. Also a light absorbing protective layer can be added to the phosphor layer. The protective layer is only absorbing the stimulating light but has a high transmittance for the emitted light. It is clear that the type of filter is chosen as a function of the wavelength of the emitted light and the wavelength of the stimulating light.

An alternative method makes use of the same readout arrangement comprising a pulsed light source. A shutter or a rotating wheel with a slit can be used to make the light source emit intermittently. The LED-array and diode laser can be pulsed directly by modulating the electric current. Argon and Krypton lasers can also be modulated with an acousto-optic modulator. The pulse time of the frequency doubled Nd:YAG laser is preferably in the range of 1% to 30% of the decay time of the phosphor luminescence. The time between two pulses is preferably in the range of 1 to 3 times the decay time of the phosphor luminescence. The charge build-up during the stimulating light pulse is clocked out of the CCD afterwards and is not used for detection of the amount of radiation. Immediately after this the CCD is reset and starts a new charge build-up phase in order to detect the stimulated light which is still present because of the decay of the phosphor. When the intensity of the emitted light becomes too small the sensed charges can be readout and a new stimulating pulse can be given whereafter a new charge detecting cycle for the same area is started. Doing so, a whole burst of stimulating pulses is given while only the charges build-up in the CCD in between the light pulses is readout. Therefore it is clear that this provides a further advantage of the invention because the phosphor can be stimulated with light having wavelengths shorter, close or equal to the wavelengths of the emitted light even if no optical filter can be found to separate them. This problem is solved by measuring the emitted light immediately after turning off the stimulation light. The charges readout between the stimulating pulses are supplied to a signal processing section where a further processing can take place. One such method is the averaging of the different signals obtained resulting in a better accuracy of the signal.

Another embodiment makes use of a method wherein a combined fibre optics is used for guiding the stimulation and stimulated light to and from the phosphor panel. Contrary to the embodiment described hereinbefore where the readout operates in a transmittance mode this embodiment uses a reflectance mode, i.e. the stimulated light is detected at the same side as which the stimulating light is radiated upon the panel.

Another new two-dimensional UV-ray radiation detector that renders a digital representation of an amount of radiation and wherein the read out rate is independent of the rate at which radiation is are captured has been given in EP-A 0 846 932. Said radiation detector comprises a two-dimensional position-sensitive gaseous photon detector characterized in that the detector comprises a radiation sensitive storage phosphor panel for storing e.g. UV-radiation, which storage means is capable of emitting image-wise modulated light, and that said two-dimensional position sensitive gaseous photon detector is arranged in order to detect said image-wise modulated light.

Two-dimensional gaseous position sensitive photon detectors are well known in the art. Examples have been described in the article 'Applications of gaseous detectors in astrophysics, medicine and biology', by F. Sauli, published in Nuclear Instruments and Methods in Physics Research A323 (1992) 1-11and in U.S. Pat. No. 5,192,861.

A preferred two-dimensional position sensitive gaseous photon detector comprises
a solid converter arranged for receiving image-wise modulated light emitted by the storage means and being operative in order to provide in response to said image-wise modulated light an output of electrons,
a gaseous electron multiplier being operative on the output of electrons from the photocathode in order to provide an electron avalanche comprising an increased number of electrons,
an electrode assembly comprising at least one anode and at least one cathode, said electrode assembly being arranged in order to collect electrons produced by said electron multiplier.

This embodiment based on secondary emission of electrons from a solid converter such as a photocathode, is preferred because of the high counting rates that can be achieved.

Typical gases suitable for use in gas-detectors that are non-ageing and that provide high gain are e.g. a neon-dimethylether mixture, dimethyl ether, isobutane, $CF_4$, $CH_4$, $C_2H_6$, methyl alcohol, alcohols such as isopropanol and ethyl alcohol, and mixtures thereof.

Although being disadvantageous from the point of view of a high cost, a photomultiplier as e.g. the HAMAMATSU type H3775, having high sensitivity at 390 nm is highly appreciated.

In one embodiment of the readout apparatus, the electronic read out means comprises means for integrating the signal corresponding with the charges that are collected by each of the anode grid members during a period of time equal to the so-called pixel-time, i.e. the time required to stimulate a pixel of the photostimulable phosphor panel. The signal obtained by charge integration is then sampled and converted into a digital signal by means of an analog-todigital converter. In another embodiment the mutually parallel members of the electrode grid are connected to a corresponding pulse counting read out circuit (also called photon counting circuit). Since the gas tube output contains a variety of noise pulses in addition to the signal pulses representing photoelectrons, simply counting of the pulses without some form of noise elimination would not result in an accurate measurement. The most effective approach to noise elimination is to investigate the height of the output pulses and for example to set a low level and a high level discriminator so that pulses smaller than the low level (which are noise pulses) and pulses higher than the upper level, are eliminated and that only pulses falling between the high and the low level are counted. Examples of components that can be used in this embodiment are known in the art and are for example described in Radiation detectors, Physical principles and applications , C. F. G. Delaney and E. C. Finch, Clarendon Press Oxford 1992, pages 249–251. The rate at which photons should be counted by such a photon counting circuit was investigated and was compared with the capabilities of the detector. For microgap chambers, which is an electron multiplier implementation, count rates up to $10^7$ counts/mm$^2$/sec are cited in technical literature.

Detection windows for these chambers are preferably covered with $BaGd_2O_4$:Tb phosphor material as described in EP-A 0 626 437, which phosphor has a decay time of from 1 to 30 msec. Further suitable phosphors for use in connection with the above described embodiment of the read out circuit are for example given in U.S. Pat. Nos. 4,239,968 and 4,806,757 and in EP-A's 0 021 342; 0 165 987; 0 174 875; 0 295 524; 0 581 066 and EP-A 0 751 200.

Additional problems arising in combination with the readout system which uses spot scanning exposure of the storage phosphor panel arises from the appearance of a certain afterglow when the storage phosphors are stimulated. As a result the signal level of the following pixel is enhanced due to a contribution of the afterglow of the previously detected pixel. A solution therefore has been sought by stimulating the stimulable phosphor panel during at least one predetermined time period causing it to emit stimulated light, wherein at least one of said readout time periods during which the photoelectric conversion means detects said stimulated light lies at least partially outside said predetermined time period(s) at which said stimulable phosphor panel is stimulated by stimulating light. In a favorable embodiment at least one of the readout time period(s) lies completely outside said predetermined time periods during which the stimulable phosphor sheet is stimulated. And in the most preferred embodiment all the stimulation periods and readout periods are totally separated. As the photoelectric conversion means detect only stimulated light during the readout periods, the characteristics of the stimulating light no longer affect the readout signal. By making use of such a so-called time resolving method even phosphors can be used where the stimulating wavelength lies within the emission spectrum of the phosphor. In a preferable embodiment the method provides stimulation of the photostimulable phosphor panel wherein use is made of a pulsed light source. In one of the embodiments of the method one stimulating light pulse is given in the beginning of the readout cycle for a given pixel, line or area. After the stimulation light pulse has ended detection of the stimulated light is started. After this period a new pixel, line or area of the phosphor panel is subjected to the readout cycle. As there is no signal measured during the first part of the readout cycle, i.e., during the stimulating pulse, no afterglow (fluorescence) of the previous pixel, line or area is measured. When during the readout period several stimulation pulses and readout periods are provided, the light pulses may have a lower energy level. This allows the use of light sources capable of such low energy pulses, which can be considered as another advantage of the readout method. In another preferable embodiment the method makes use of a laser scanner for providing stimulation of the phosphor panel for readout. In another preferable embodiment the detection of the stimulated light is done using a line sensor and in a further embodiment the detection of the stimulated light is done using a two dimensional matrix sensor.

The irradiation of the phosphor with penetrating radiation is repeated, but the reading of the amount of stimulable light for a given intensity of stimulating energy only takes place after keeping the irradiated phosphor for a given time in the dark. This process is repeated and the time after which the emitted fluorescent light, (and thus the energy remaining in the phosphor) of a phosphor kept in the dark, has fallen to 1/e is recorded as "dark decay".

A storage phosphor, for use in the first embodiment of this invention, has preferably a dark decay longer than 120 minutes.

After reading out the energy stored in the storage phosphor it is clear that no rest energy should be left in order to prevent an intolerable increase of the stored energy after a next exposure. Therefore an indicator according to the present invention has a storage phosphor panel comprising storage phosphors with an electronically erasable memory, wherein erasure is performed in the case of reusable personal monitors as in the present invention at the end of the readout procedure in the apparatus wherein the loaded stimulable phosphor is read out. The light tight covering of the phosphor further offers the advantage that a storage phosphor with high "erasability" but with slow "dark decay" can advantageously be used in the context of the present invention.

After read out, the photostimulable phosphor layer is subjected to an erasure operation in order to remove any residual image left in the layer with the purpose to re-use the indicator. In practice the stored radiation energy is not completely eliminated by the read out process. In order to make the screen reusable, it is fed from the readout station in the apparatus to an erasing station, where part of the energy still remaining in the phosphor after read out is erased by subjecting the screen to a uniform illumination by means of erasing light. But even if a photo-stimulable phosphor screen is erased after being read out, it is still possible that residual energy is left on the read out screen or panel. This may be caused by non-optimal adjustment or control of the amount of erasing energy that is applied to the photostimulable phosphor screen.

Non-optimal adjustment of the applied amount of erasing energy may be the result of the fact that the period of time during which a photostimulable phosphor screen is subjected to erasing light is too short (for example as a result of incorrect transport speed of the screen), or that the amount of energy emitted by the erasing light sources to the phosphor screen to be erased does not correspond with the set amount (for example due to a failing lamp), etc.

Only few of the possible causes have been mentioned, other causes are may be envisaged. When a storage panel that has not been erased to an acceptable level is re-used and again exposed to radiation, the residual signal left in the screen will thus be detected accumulatively.

Erasure of photostimulable phosphor screens is well-known in the art and can e.g. be obtained by subjecting the layer to an overall illumination with light within the stimulation wavelength range. During the erasure operation the high voltage supply is turned off in the case wherein a photomultiplier is used in order to prevent damaging of the read out electronics. The read out electronics are also subjected to a reset operation before being used to read a subsequent radiation dose.

In EP-A 0 345 832 e.g. a method and an apparatus for recording and reading out radiation signals is disclosed. The apparatus therefore comprises a circulatory feed system for feeding photostimulable phosphor sheets along a predetermined circulatory feed path comprising in sequence an exposure unit, a read out unit and an erasure unit. Prior to successive recording of images on the sheets, any remaining images are erased therein. After erasure the sheet is again read out and the signal level is threshold.

If the signal level is higher than a certain level, then the remaining image is erased again in the image erase unit. The erasure step is repeated until the remaining image is sufficiently small.

The apparatus provides a method of reading an amount of radiation stored in a photostimulable phosphor panel of the indicator according to the present invention, comprising as steps:
1) scanning said screen with stimulating radiation,
2) detecting light emitted upon stimulation,
3) converting detected light into an electric signal representation of said image,
4) subjecting said screen to erasing light in order to obtain an erased screen,
5) applying steps 1 to 3 to at least part of said erased screen,
6) thresholding an electric signal obtained as a result of step (5) by means of a threshold signal value representative of a maximum amount of emitted light that is allowed to be detected on an erased screen,
wherein said erased screen is scanned in step (5) at a resolution that is lower than the resolution at which the screen is scanned in step (1).

Preferably according to the present invention the resolution at which the erased panel or at least part thereof is scanned is lower than the resolution at which scanning of the panel is performed during read out prior to erasure. In this way the period of time occupied by the additional reading of the erased screen is kept to a minimum.

In a particular embodiment the panel is scanned by deflecting a light beam in a first direction and transporting the panel in a second direction that is perpendicular to said first direction. The resolution at which the panel is scanned in step (5) is decreased relative to the resolution at which the panel is scanned at step (1) by adjusting the speed at which the erased panel is transported in said second direction during step (5) to be higher than the speed at which the screen is transported in said second direction in step (1).

The energy remaining in the panel after erasure should be sufficiently small. Preferably the signal level detected when the panel is read a second time at highest machine sensitivity is a 1000 times smaller than the maximum dynamic range of the read out apparatus at said highest sensitivity.

In case the signal resulting from step (5) exceeds a preset threshold signal value, this indicates that the panel has not been erased to an adequate extent allowing re-use of the screen. In this case the panel is either to be erased once more or it is to be decided that the particular panel cannot be re-used further. In that case the apparatus can swallow the indicator in order to recycle the different components thereof, as e.g. particularly the housing and the phosphor thereof.

Another aspect of the present invention relates to an apparatus for reading a radiation signal (radiation energy) that has been stored in a photostimulable phosphor panel comprising (i) a read out unit with means for scanning the storage panel by means of stimulating radiation and means for detecting light emitted by said panel upon stimulation and converting detected light into a first electric signal representative of said radiation signal,
(ii) an erasing unit for subjecting the panel to erasing light in order to obtain an erased panel,
(iii) means for transporting the panel from said read out unit to said erasing unit, wherein said apparatus further comprises
(iv) means for transporting an erased panel from said erasing unit through a read out unit,
(v) means for thresholding a second electric signal obtained by scanning at least part of an erased screen with stimulating radiation when it is transported through the read out unit, by detecting light emitted thereby and by converting said light emitted thereby into an electric signal, by means of a threshold signal representative of a maximum amount of emitted light that is allowed to be detected when an erased panel is scanned, wherein means are provided for decreasing the resolution at which an erased panel is scanned relative to the resolution at which a panel having stored therein a radiation signal (energy), is scanned.

In a preferred embodiment the apparatus of the above-described kind has a single read-out unit. Such an apparatus is particularly advantageous from the viewpoint of economy and compact design.

In a read out apparatus according to this preferred embodiment a read out unit is preferably located in between the input of the apparatus and the erasing unit.

In a further preferred embodiment the apparatus further comprises means for transporting the panel from the input unit through the read out unit to the erasure unit and means for reversing the transport direction so that the panel is transported from the erasure unit through the read out unit to the input unit.

Preferably the means for transporting the panel performs the transport substantially in a single plane.

A still more practical and relatively easy performance for the operation of this apparatus is as follows. The phosphor sample is present in a cassette which contains an optical filter at the top. Only the ultraviolet light can pass this filter. When the personal monitor cassette in form of a diskette is fed into the read-out apparatus (in form of a disk-drive) the filter is automatically moved away. The emitted light of the phosphor is measured during stimulation. Therefore the light of a diode laser or a LED is coupled into a fibre of 1 mm diameter. The end of this fibre is placed 5 mm above the phosphor sample. By doing so the light is spread out over an area of about 1 cm$^2$. At the same distance an array of fibers are capturing the emitted light. At the other end of these fibres an optical filter and a photomultiplier are placed in order to detect the light.

Upon termination of the read-out operation, the phosphor is stimulated for a longer time with the same light source in order to erase the phosphor. It can also be transported to an erasing unit but it is clear that this embodiment is in favor of saving time and space. After erasing the phosphor is measured again. This residual signal is compared with the first signal and the difference between these signals is representative for the dose.

In another, more complicated apparatus, the panel is taken out of the cassette at the input unit and fed into the read out unit where it is measured by means of stimulating radiation.

Light emitted upon stimulation is detected and converted into an image signal. Upon termination of the read out operation, the phosphor is stimulated for a longer time with the same light source in order to erase the phosphor. It can also be transported to an erasing unit where it is subjected to an illumination with erasing light, but it is clear that such an apparatus is less compact, more complicated and more expensive. Finally, the transport direction is reversed and the read out and erased panel is again transported through the read out unit to the input unit where it is put back into the cassette. In the read out unit the erased panel is scanned by means of stimulating radiation and, again, the light emitted upon stimulation is detected and converted into an electric signal. This signal now represents the residual signal left in the panel after erasure. This signal is then applied to an electronic comparator where its value is compared with a threshold signal representative of a maximum energy level that is allowed to be detected on the panel after erasure.

In another particular embodiment the phosphor panel is entirely taken out of the cassette. Therefore the panel is conveyed in a cassette of the type comprising a flat substantially rigid base plate and a cap (as a shutter element) for the base plate which is releasably securable to the base plate in order to cover light-tightly the layer of photostimulable phosphor material applied to the base plate. In this embodiment the cassette is opened by lifting the cap. The cap is held in a position outside the read out apparatus. The base plate conveying the photostimulable phosphor screen is transported through the read out and erasing units.

Because the transport of the cassette is organized in such a way that the read out cassette is passed through the read out unit for a second time, it is not necessary in this type of apparatus to provide additional means, such as additional cassette transport means or additional read out means, in order to allow read out of the erased panel. The design of the apparatus can be made very compact in this way (e.g. small as a disk-drive unit in a computer, apart from the built-in display which makes part of it), which is very favorable in this application.

While the present invention has be described in connection with one or more preferred embodiments thereof, it will be understood that it was not intended to limit the invention to those embodiments. On the contrary, it was intended to cover all alternatives, modification and equivalents as included in the spirit and scope of the invention and as defined by the claims.

What is Claimed is:

1. A personal monitor comprising a storage medium for absorbing incident radiation energy, wherein said storage medium comprises a storage phosphor panel capable to store radiation energy originating from radiation having a wavelength of 350 nm or less, wherein said panel is covered with an optical filter absorbing radiation having a wavelength of 350 nm or more, wherein said panel is present in a housing and wherein said incident radiation is substantially composed of UV-B and UV-A rays in the wavelength range from 250 to 350 nm.

2. A personal monitor comprising a storage medium for absorbing incident radiation energy, wherein said storage medium comprises a storage phosphor panel capable to store radiation energy originating from radiation having a wavelength of 350 nm or less, wherein said panel is covered with an optical filter absorbing radiation having a wavelength of 350 nm or more, wherein said panel is present in a housing; and said personal monitor further comprising a digital memory storing medium.

3. A personal monitor according to claim 2, wherein said digital memory storing medium is an EPROM, a bubble memory, a non-volatile RAM or a magnetic memory.

4. Method to determine in a quantitative way stored amounts of radiation energy originating from radiation having a wavelength of 350 nm or less, comprising the steps of:

i) providing a personal monitor comprising a storage medium for absorbing incident radiation energy, wherein said storage medium comprises a storage phosphor panel capable to store radiation energy originating from radiation having a wavelength of 350 nm or less, wherein said panel is covered with an optical filter absorbing radiation having a wavelength of 350 nm or more, wherein said panel is present in a housing;

ii) opening the housing of said monitor thereby irradiating said storage phosphor panel covered with said optical filter by incident radiation in such a way that said panel is exposed proportionally and simultaneously with an object which is sensitive to said radiation;

iii) closing the said housing;

iv) reading out said storage phosphor panel by the steps of entering the personal monitor in a read-out apparatus, removing the optical filter covering the storage phosphor panel, adding stimulating energy to the said storage phosphor panel, digitally detecting energy released from said storage phosphor panel by a detector;

v) erasing stored rest energy.

5. Method according to claim 4, wherein said stimulating energy is originated from visible light, from thermal energy or from electroluminescent energy.

6. Method to determine in a quantitative way stored amounts of radiation energy originating from radiation having a wavelength of 350 nm or less, comprising the steps of:

i) providing a personal monitor in a housing;

ii) opening the housing of said monitor thereby irradiating a storage phosphor panel covered with an optical filter by incident radiation in such a way that said panel is exposed proportionally and simultaneously with an object which is sensitive to said radiation;

iii) closing the said housing, iv) reading out said storage phosphor panel by the steps of entering the personal monitor in a read-out apparatus, removing the optical filter covering the storage phosphor panel, adding stimulating energy to the said storage phosphor panel, wherein detecting said released energy proceeds by an optical system comprising a photomultiplier, a photodiode, a phototransistor or a gas detector; and v) erasing stored rest energy.

7. Method according to claim 6, wherein said optical system collimates light with optical fibers, leading it to a light detector, wherein, before entering said light detector, an optical filter is present absorbing stimulating energy and transmitting released energy.

* * * * *